(12) United States Patent
Guering

(10) Patent No.: US 8,100,362 B2
(45) Date of Patent: Jan. 24, 2012

(54) COCKPIT AND AIRCRAFT INCLUDING SUCH COCKPIT

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 750 days.

(21) Appl. No.: 12/162,379

(22) PCT Filed: Jan. 29, 2007

(86) PCT No.: PCT/EP2007/050844
§ 371 (c)(1),
(2), (4) Date: Nov. 4, 2008

(87) PCT Pub. No.: WO2007/085655
PCT Pub. Date: Aug. 2, 2007

(65) Prior Publication Data
US 2009/0050739 A1  Feb. 26, 2009

(30) Foreign Application Priority Data

Jan. 30, 2006  (FR) ..................... 06 50324

(51) Int. Cl.
*B64C 1/00* (2006.01)
*B64C 13/00* (2006.01)
*B64C 13/04* (2006.01)
*B64C 39/02* (2006.01)
*B64D 25/12* (2006.01)

(52) U.S. Cl. ............ 244/120; 244/119; 244/118.2; 244/118.5; 244/2; 244/140; 244/4 R

(58) Field of Classification Search ............. 244/118.2, 244/120, 118.5, 140, 1 R, 2, 4 R, 119, 117 R, 244/118.1, 138 R, 139, 172.1, 3
See application file for complete search history.

(56) References Cited

U.S. PATENT DOCUMENTS

| | | | | |
|---|---|---|---|---|
| 2,263,365 A | * | 11/1941 | Nicolaus et al. | ............... 244/59 |
| 2,403,595 A | | 7/1946 | Growald | |
| 2,447,665 A | | 8/1948 | Protzeller | |
| 2,702,680 A | * | 2/1955 | Heinemann et al. | ......... 244/140 |
| 3,009,672 A | * | 11/1961 | Tharratt | ................. 244/137.1 |
| 4,379,533 A | * | 4/1983 | Caldwell et al. | .......... 244/118.1 |
| 4,736,910 A | * | 4/1988 | O'Quinn et al. | ............. 244/120 |
| 6,129,308 A | * | 10/2000 | Nastasi et al. | ................. 244/36 |
| 6,497,388 B1 | | 12/2002 | Friend et al. | |
| 6,776,373 B1 | * | 8/2004 | Talmage, Jr. | ................. 244/140 |
| 2005/0242240 A1 | * | 11/2005 | Giannakopoulos | .......... 244/140 |
| 2008/0164377 A1 | * | 7/2008 | Lautridou et al. | ........... 244/229 |

FOREIGN PATENT DOCUMENTS

FR  2667042 A1  3/1992

OTHER PUBLICATIONS

International Search Report dated May 18, 2007.

* cited by examiner

*Primary Examiner* — Joshua Michener
(74) *Attorney, Agent, or Firm* — Perman & Green, LLP

(57) ABSTRACT

A cockpit and an aircraft including such cockpit. The cockpit includes a front section of an aircraft. Such cockpit includes a pressure bulkhead sealing the section and a pressurization system for pressurizing such section.

11 Claims, 3 Drawing Sheets

COCKPIT AND AIRCRAFT INCLUDING SUCH COCKPIT

CROSS REFERENCE TO RELATED APPLICATIONS

This application is the National Stage of International Application No. PCT/EP2007/050844, International Filing Date, 29 Jan. 2007, which designated the United States of America, and which International Application was published under PCT Article 21 (2) as WO Publication No. WO2007/085655 and which claims priority from French Application No. 0650324, filed on 30 Jan. 2006, the disclosures of which are incorporated herein by reference in their entireties.

BACKGROUND

1. Field

The disclosed embodiments relate to a flight deck or cockpit for an aircraft and an aircraft including such cockpit. The disclosed embodiments more specially aims at a carrier aircraft for transporting special, bulky and/or heavy freight, in particular components intended for the assembling of aircrafts, such as aircraft wings, and also industrial machines, complete helicopters and humanitarian aid for example.

2. Brief Description of Related Developments

Carrier aircrafts for transporting bulky freight such as fuselage sections or components of a space station are known. Such a plane, for example the Beluga, carries freight from an aircraft manufacturer's various manufacturing sites to the final assembling site, so that a complete aircraft can be built.

Although such a plane can be derived from an existing aircraft, designing a carrier aircraft requires new studies and developments, so as to build a widebody cargo aircraft. More particularly, the internal volume housing the freight must be notably increased while keeping the aerodynamic properties and the weathercock stability required by a cargo aircraft.

Such studies and development require substantial efforts from the manufacturer, in terms of technical means, as well as skilled labour and costs.

The development of a nose cone and the integration of avionics systems are particularly difficult, from a technical point of view, and costly.

It would also be advantageous to have a freight carrying aircraft having a carrying capacity greater than that of the known cargo aircrafts because of the increasing need for a fast transportation of large equipment and/or components, with reduced transportation costs.

Besides, on a multi-engined aircraft, the engines of which are positioned under or on the airfoil, the fuselage is broken down into three distinct parts. A first part, positioned at the front, comprises the cockpit, several cargo bays and a nose cone. Such nose cone houses the radar, the antenna of which is covered by a radome. The fuselage also comprises a central part which is used as a cabin for passengers or as a cargo bay for luggage or freight and which the wings are fixed on. Finally, it comprises a generally single-piece rear part, having a conical shape, which the horizontal and vertical tail fins are connected with.

SUMMARY

Now the cockpit is generally separated from the central part by a simple bulkhead including a door to give/bar access thereto.

The cockpit is pressurized by the system pressurizing the rest of the aircraft, and more particularly the central part. Accordingly, the cockpit is not an independent module.

The object of the disclosed embodiments are thus to provide a cockpit having a simple design and a simple operating procedure, being economical and which can be pressurized independently from the rest of the aircraft and thus constituting a self-contained module.

Another object of the disclosed embodiments is a particularly simple and low cost aircraft, the cockpit of which is a self-contained module partially inserted into an elementary fuselage having a large carrying capacity.

The disclosed embodiments thus makes it possible to build a self-contained module which can be integrated into a basic fuselage, via a number of discrete points, from the nose cone of a developed and industrialized airliner, in order to provide a widebody cargo aircraft.

Therefore, the disclosed embodiments relate to a cockpit comprising an aircraft nose cone.

According to the disclosed embodiments, such cockpit includes a pressure bulkhead sealing the section and a pressurization system for pressurizing the section.

"aircraft nose cone" means a truncated front section including neither the radar nor the radome covering the radar antenna. Such section is however completely provided with means required for flying an aircraft, and more particularly with an electric flight control system including calculators. It is also totally equipped.

In various particular embodiments of such cockpit, each having special advantages and open to numerous possible technical combinations:

the bulkhead is substantially plane and includes means for fixing the section to a fuselage, The section further includes attaching devices at the front of the truncated part thereof. Such attaching devices are, for illustration purposes only, lugs provided with an orifice.

the pressurization system comprises at least one pressure controller connected to a control unit, a bleed valve driven by a motor receiving signals from the control unit, it includes an electric flight control system including calculators connected to outlets which are positioned on the pressure bulkhead, such outlets being intended for receiving connections to an aircraft control devices such as servo-actuators, such outlets are able to receive electric connections or optical fibres, the bulkhead includes an element giving access to the inside of the section, such access element being airtight when in closed position, the cockpit includes floor panels, each comprising at least one mounting rail for equipping the cockpit.

Such floor panels limit the upper part of an avionics bay where electronic and computer means enabling to control the various devices of the aircraft and more particularly the servo-actuators of the aircraft are positioned. Such floor panels also make it possible to equip the cabin with seats, galleys, toilets, etc. . . .

Advantageously, the mounting rail is made in a material meeting the mechanical strength and corrosion resistance criteria related to applications in the field of aeronautics. It may be, for example, titanium or an aluminium alloy.

The disclosed embodiments also relate to an aircraft having a hollow fuselage, at least in the front part thereof.

According to the disclosed embodiments, such aircraft includes a cockpit partially inserted into an orifice positioned in the front upper part of the fuselage. Such cockpit is connected to such fuselage by connection means.

Advantageously, such orifice has a shape allowing providing aerodynamic continuity between the fuselage and the partially inserted cockpit, in order to prevent any air intrusion into the fuselage.

As a matter of fact, the fairing of the thus obtained assembly enables a flowing of air which avoids the formation of turbulences which could otherwise favour the intrusion of air inside the fuselage.

Preferably, the fuselage comprises at least two transverse beams positioned at the front and at the back of said section. The connection means comprise devices for fixing the section to such beams and at least four slanted stiffening link rods laterally connected in pairs, at one of the ends thereof, to the front and to the back of said section and at the other end thereof, to said beams by a ball and socket joint.

Finally, the disclosed embodiments relate to a carrier aircraft. According to the disclosed embodiments such aircraft is an aeroplane such as described hereabove, the fuselage having an unobstructed internal volume having a longitudinal dimension greater than 35 m and a height greater than 8 m.

The disclosed embodiments will be described in greater details while referring to the appended drawings, wherein:

DETAILED DESCRIPTION OF THE DRAWINGS

Figure 1:
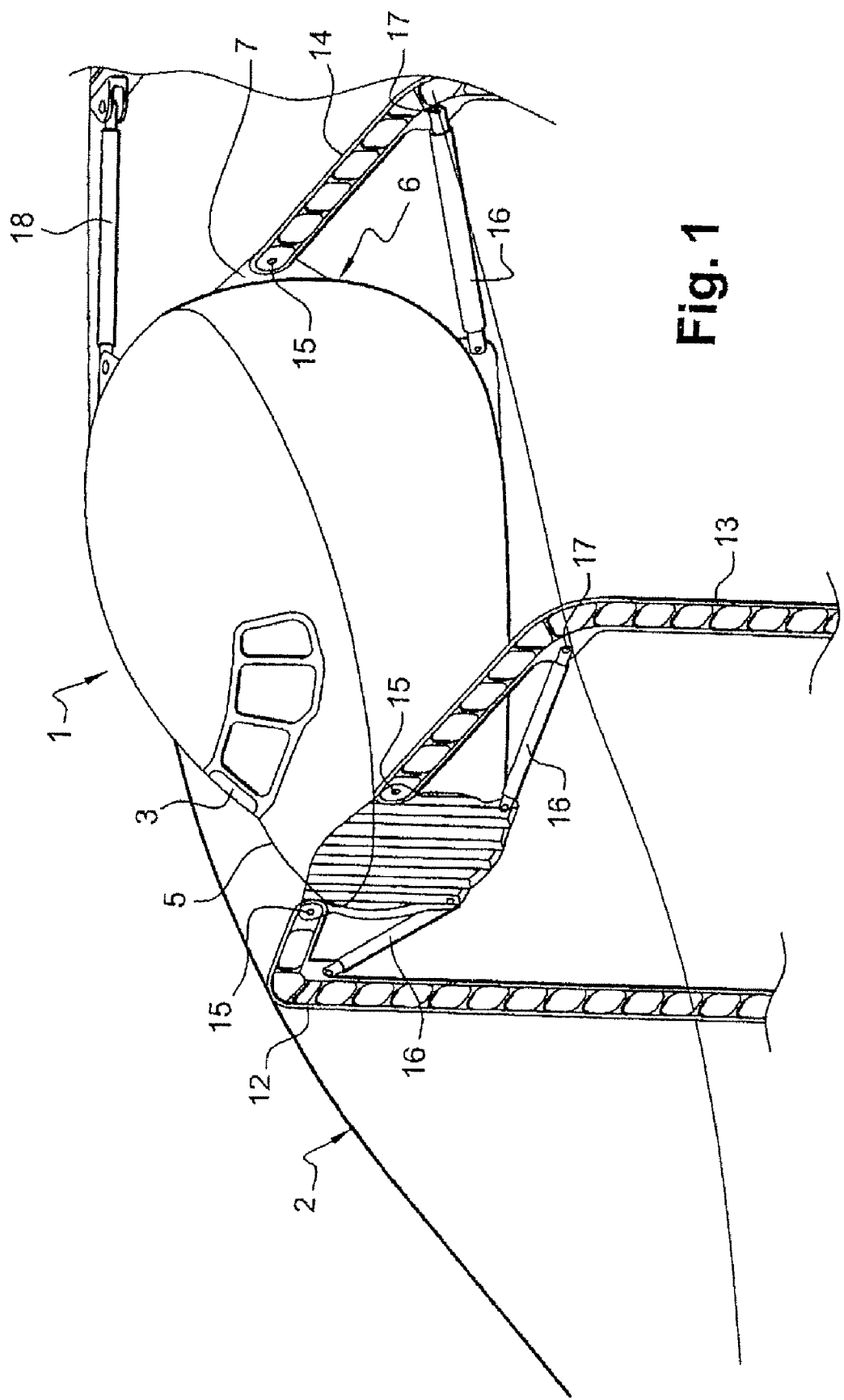
FIG. 1 shows a partial view of the front part of the fuselage of an aircraft according to an embodiment, a cockpit being inserted into such fuselage and being connected thereto.
Figure 2:
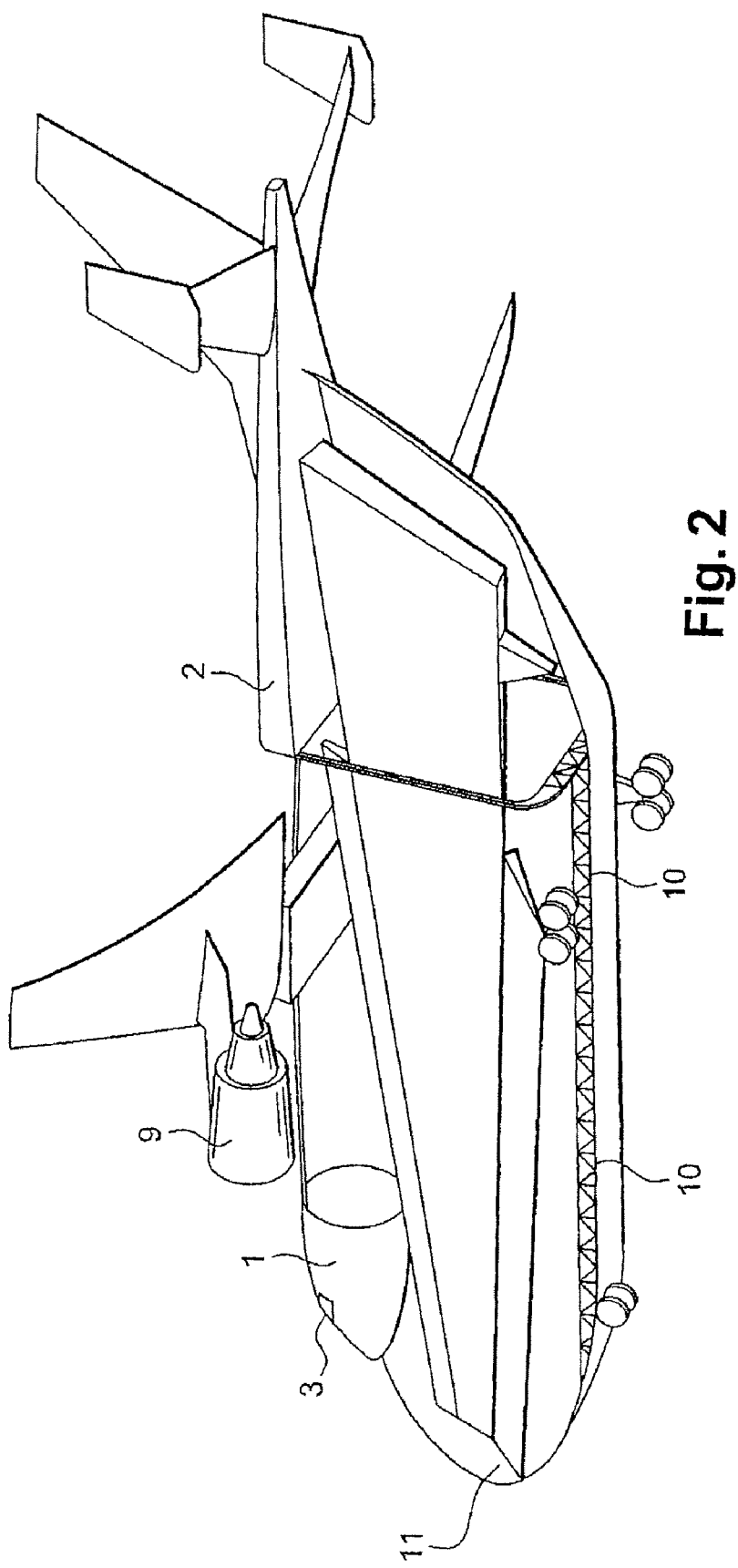
FIG. 2 is a perspective view of an aircraft according to an embodiment, the fuselage of such aircraft being shown partially in cross-section.

FIG. 1 shows a cockpit 1, also referred to in some cases a flight deck, according to an embodiment inserted into an orifice provided in the front upper part of the fuselage 2 of an aircraft. Such cockpit 1 comprises a front section of an aircraft with the windscreen 3 thereof.

The cockpit is connected to the fuselage 2 by means of connection means 4. The orifice 5 has a shape advantageously allowing providing aerodynamic continuity between the fuselage 2 and the partially inserted cockpit 1 in order to prevent any air intrusion into the fuselage.

Such cockpit 1 includes a pressure bulkhead 6 sealing the section 1 and a pressurization system for pressurizing such section. Such pressure bulkhead 6 is preferably substantially plane and includes attaching devices 7 such as lugs for fixing the cockpit 1 to the fuselage 2, using fixing devices.

The bulkhead 6 includes a device giving access to the inside of the section, such access element being airtight when in closed position. Such access element may be a door, for example.

Such bulkhead is further made of a material meeting the mechanical strength and corrosion resistance criteria related to applications in the field of aeronautics. As a matter of fact, such bulkhead must resist the mechanical stresses inherent in the pressurization of the cockpit 1 and a possible non-pressurization of the unobstructed internal volume of the aircraft.

The material selected for making the bulkhead is chosen in the group comprising duralumin, steel, aluminium alloys, or similar.

The pressurization system of the cockpit advantageously comprises two digital pressure controllers, which are self-contained and identical to each other. They are, each, connected to a control unit comprising a calculator providing the automatic regulation of pressure inside the cockpit. A control unit and its controller form a stand-by circuit, the other set being the active pressurization circuit.

Of course, such control can be carried out manually by the pilot.

The system includes a motor-driven bleed valve. A signal indicating the open or closed position of such valve is sent to the control unit of the active circuit. The motor is able to receive signals from said control unit relating to valve condition changes.

Such pressurization system further includes at least one pneumatic safety valve to prevent the occurrence of a differential pressure in excess.

The cockpit 1 is provided with an electric flight control system making it possible to advantageously eliminate the difficult coupling, with mechanical connecting means (cables and/or slave connecting rods, countershafts, pulleys, etc. . . . ) between the cockpit and the flight control system, upon the integration of the cockpit into the fuselage.

The electric flight control system comprises calculators, and such calculators are connected to outlets positioned on said pressure bulkhead. Such outlets are intended for receiving connections to the aircraft control devices such as servo-actuators.

Such outlets are able to receive electric connections or optical fibres. The optical fibres may be monomode or multimode, which makes it possible to forward the signals on a greater distance inside the aircraft, while guaranteeing electric interferences immunity. As a variation, it may also be a wire connection of the Ethernet type.

The aircraft includes a hollow fuselage 2 which wings 8, engines 9 and brakes are connected to. The front part of such fuselage does not include a cockpit but a hollow body. The aircraft body assembly may also be hollow, and thus include only required reinforcing elements such as beams 10 and floor elements.

At the nose cone 11 of such fuselage is positioned a radar, the antenna of which is covered with a radome letting the radar waves through.

The fuselage comprises two pairs of half beams 12, 13, 14 positioned, each, at the front and at the back of the section. Each half beams 12, 13, 14 is positioned laterally to the section. It also includes a stiffening beam positioned behind the two half beams 14 positioned at the back of the front section.

The connecting means comprise means 15 for fixing the section to such half beams and for each half beam, a slanted stiffening link rod 16 laterally connected at one of the ends thereof, to the section 1 and at the other end thereof, to said half beams by a ball and socket joint 17. The fixing devices 15 are for example rivets.

Such means also comprise a link rod 18 locking the frontward/backward motion of the section 1, such link rod 18 being fastened at one end thereof to the upper back part of the section and at the other end thereof to the stiffening beam.

Such half beams 12, 13, 14 and beams are advantageously truss booms giving access to the cockpit.

Figure 3:
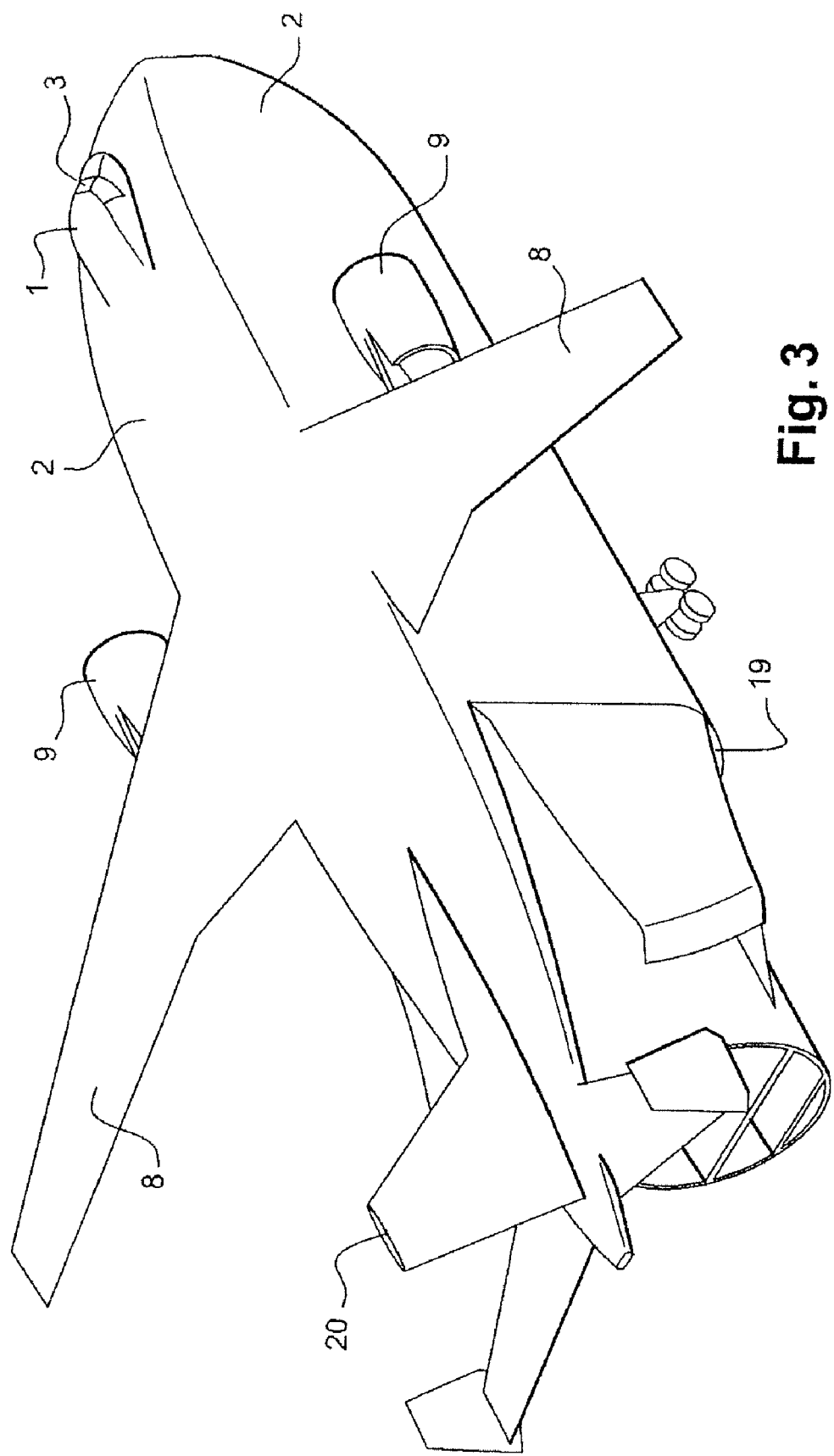
FIG. 3 is a perspective schematic view of the aircraft of FIG. 1.

The aircraft fuselage advantageously includes a rear door having a vertical dimension greater than 9 m giving access to the internal volume of said aircraft. Such door, as illustrated in FIG. 3, is a door including two panels 19, 20 which may move away from one another to give access to the internal volume of the aircraft when they are opened manually or by a motor-driven control device which may be connected to the cockpit.

The invention claimed is:

1. An aircraft having a hollow fuselage, at least in a front part thereof, wherein said aircraft includes:
   a cockpit partially inserted into an orifice positioned in an upper part of said fuselage and connected to said fuselage by connection means; said cockpit comprising: a front section of said aircraft, wherein said cockpit includes a pressure bulkhead sealing the front section and a pressurization system for pressurizing said front section and in that said pressure bulkhead is substantially plane and includes attaching devices for receiving devices for fixing said front section to said fuselage;
   wherein said fuselage comprising at least two transverse beams positioned at a front and at a back of said front section, respectively, said connection means comprise means for fixing said front section to said transverse beams and at least four slanted stiffening link rods laterally connected in pairs, at one of the ends thereof, to the front and to the back of said front section and at the other end thereof, to said transverse beams by a ball and socket joint.

2. The aircraft according to claim 1, wherein said pressurization system includes at least one pressure controller connected to a control unit, a motor-driven bleed valve, said motor receiving signals from said control unit.

3. The aircraft according to claim 1, wherein, said aircraft further includes an electric flight control system including calculators, said calculators are connected to outlets positioned on said pressure bulkhead, said outlets being intended for receiving connections to aircraft control devices.

4. The aircraft according to claim 3, wherein said outlets are able to receive electric connections or optical fibres.

5. The aircraft according to claim 1, wherein said pressure bulkhead includes a device giving access to an inside of said front section, said device being airtight when in a closed position.

6. An aircraft according to claim 1, wherein said orifice has a shape providing aerodynamic continuity between said fuselage and said cockpit in order to prevent any air intrusion into the fuselage.

7. An aircraft according to claim 1, wherein said fuselage having a beam positioned behind said transverse beam fastened to the back of said front section, the connection means comprise a link rod locking the frontward/backward motion of said front section, said link rod being fastened to the upper part of said front section.

8. An aircraft according to claim 1, wherein said transverse beams are truss booms allowing access to said cockpit.

9. An aircraft according to claim 1, further comprising a nose cone, wherein the cone comprises a radar.

10. An aircraft according to claim 1, wherein said fuselage includes a rear door having a vertical dimension greater than 9 m giving access to an internal volume of said aircraft.

11. A carrier aircraft comprising:
    a hollow fuselage, at least in a front part thereof, wherein said aircraft includes:
    a cockpit partially inserted into an orifice positioned in an upper part of said fuselage and connected to said fuselage by connection means; said cockpit comprising: a front section of said aircraft, wherein said cockpit includes a pressure bulkhead sealing the front section and a pressurization system for pressurizing said front section and in that said pressure bulkhead is substantially plane and includes attaching devices for receiving devices for fixing said front section to said fuselage;
    wherein said fuselage comprising at least two transverse beams positioned at a front and at a back of said front section, respectively, said connection means comprise means for fixing said front section to said transverse beams and at least four slanted stiffening link rods laterally connected in pairs, at one of the ends thereof, to the front and to the back of said front section and at the other end thereof, to said transverse beams by a ball and socket joint; and
    said fuselage has an unobstructed internal volume having a longitudinal dimension greater than 35 m and a height greater than 8 m.

* * * * *